US010785307B2

(12) United States Patent
DeLuca et al.

(10) Patent No.: US 10,785,307 B2
(45) Date of Patent: Sep. 22, 2020

(54) USING VISUAL RECOGNITION AND MICRO-LOCATION DATA TO TRIGGER INTERNET OF THINGS SENSOR EVENTS

(71) Applicant: INTERNATIONAL BUSINESS MACHINES CORPORATION, Armonk, NY (US)

(72) Inventors: Lisa Seacat DeLuca, Baltimore, MD (US); Peter G. Finn, Markham (CA)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 16/145,639

(22) Filed: Sep. 28, 2018

(65) Prior Publication Data

US 2020/0106835 A1    Apr. 2, 2020

(51) Int. Cl.
| | |
|---|---|
| *H04N 7/16* | (2011.01) |
| *H04L 29/08* | (2006.01) |
| *H04W 4/02* | (2018.01) |
| *G06K 9/00* | (2006.01) |
| *H04L 12/28* | (2006.01) |
| *G06K 9/62* | (2006.01) |
| *H04W 4/70* | (2018.01) |

(52) U.S. Cl.
CPC .......... *H04L 67/12* (2013.01); *G06K 9/00288* (2013.01); *G06K 9/6215* (2013.01); *H04L 12/2816* (2013.01); *H04W 4/02* (2013.01); *H04W 4/70* (2018.02)

(58) Field of Classification Search
CPC . H04L 67/12; H04L 12/2803; H04L 12/2816; H04W 4/70; H04W 4/02; G06K 9/00288; G06K 9/6215
See application file for complete search history.

(56) References Cited

U.S. PATENT DOCUMENTS

| | | |
|---|---|---|
| 9,210,534 B1 | 12/2015 | Matthieu et al. |
| 2014/0203939 A1 | 7/2014 | Harrington et al. |
| 2016/0162980 A1 | 6/2016 | Oldre |
| 2017/0279631 A1 | 9/2017 | Britt et al. |
| 2018/0082502 A1* | 3/2018 | Browning ............... H04L 67/26 |
| 2018/0288567 A1* | 10/2018 | Maloney ................. H04L 67/18 |
| 2019/0266886 A1* | 8/2019 | Jiang .................... G06F 16/5838 |

OTHER PUBLICATIONS

Allan, "MIT's Reality Editor Controls IoT Devices via Augmented Reality," Make Magazine, Dec. 18, 2015, p. 1-6, Maker Media Inc., https://makezine.com/2015/12/18/mit-reality-editor-controls-iot-devices-augmented-reality/, Accessed on Sep. 27, 2018.

(Continued)

*Primary Examiner* — Mulugeta Mengesha
(74) *Attorney, Agent, or Firm* — Kenneth Han

(57) ABSTRACT

A method, computer system, and a computer program product for using a set of visual recognition data and a set of micro-location data to trigger one or more IoT sensor events is provided. The present invention may include triggering the one or more IoT sensor events to at least one object based on receiving a user request, wherein the at least one object is selected for triggering using at least one camera device, and further based on at least one micro-location device within a certain proximity to a location of the user.

17 Claims, 5 Drawing Sheets

(56) References Cited

OTHER PUBLICATIONS

Anonymous, "Method and System for Creating Dynamic Image and Video Filters using Internet of Things (IoT) Sensing Data," An IP.com Prior Art Database Technical Disclosure, Aug. 20, 2017, 4 Pages, IP.com No. IPCOM000250677D.

Catchoom, "Highest-Precision Visual Search Solution," Catchoom Image Recognition, p. 1-4, https://catchoom.com/image-recognition/, Accessed on Sep. 27, 2018.

Enabled, "Case Study: Clipsal," Enabled—Customer Engagement & Ecommerce Platform, p. 1-8, https://enabled.com.au/casestudy-Clipsal, Accessed on Sep. 27, 2018.

Hom et al., "Multiple Device and Sensor Based User Recognition," An IP.com Prior Art Database Technical Disclosure, Oct. 29, 2017, 4 Pages, IP.com No. IPCOM000251294D.

Larizgoitia et al., "Web of Things: Concepts, Technologies and Applications for Connecting Physical Objects to the Web," The International Conference on Web Engineering (ICWE 2014), Jul. 1, 2014, 104 Pages, Evrythng Limited.

Leone et al., "An Intelligent Cooperative Visual Sensor Network for Urban Mobility," Sensors, 2017, p. 1-25, vol. 17, Issue 11.

Mell et al., "The NIST Definition of Cloud Computing," National Institute of Standards and Technology, Sep. 2011, p. 1-3, Special Publication 800-145.

Perera et al., "A Survey on Internet of Things From Industrial Market Perspective," IEEE Access, 2014, p. 1660-1679, vol. 2.

Prat et al., "Accessing IoT Sensor Data from Multiple Locations," An IP.com Prior Art Database Technical Disclosure, Jun. 21, 2016, p. 1-6, IP.com No. IPCOM000246617D, Cisco Systems, Inc.

\* cited by examiner

USING VISUAL RECOGNITION AND MICRO-LOCATION DATA TO TRIGGER INTERNET OF THINGS SENSOR EVENTS

BACKGROUND

The present invention relates generally to the field of computing, and more particularly to home/office automation technology.

When making "things" in our homes and offices internet enabled, a person may have to assign a unique name or know the name for a specific bank or group of lights for each internet enabled device. For example, a person assigns the name "living room lights" to switch on or off the lights located in the living room of the person's home. The person will use the name "living room lights" to instruct an application to switch on the lights located in the living room. As such, a person will assign a plethora of unique names for different devices within the person's home and office, which the person must keep track of and remember for the internet enabled devices to perform various functions at the command of the person.

SUMMARY

Embodiments of the present invention disclose a method, computer system, and a computer program product for using a set of visual recognition data and a set of micro-location data to trigger one or more IoT sensor events. The present invention may include triggering the one or more IoT sensor events to at least one object based on receiving a user request, wherein the at least one object is selected for triggering using at least one camera device, and further based on at least one micro-location device within a certain proximity to a location of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
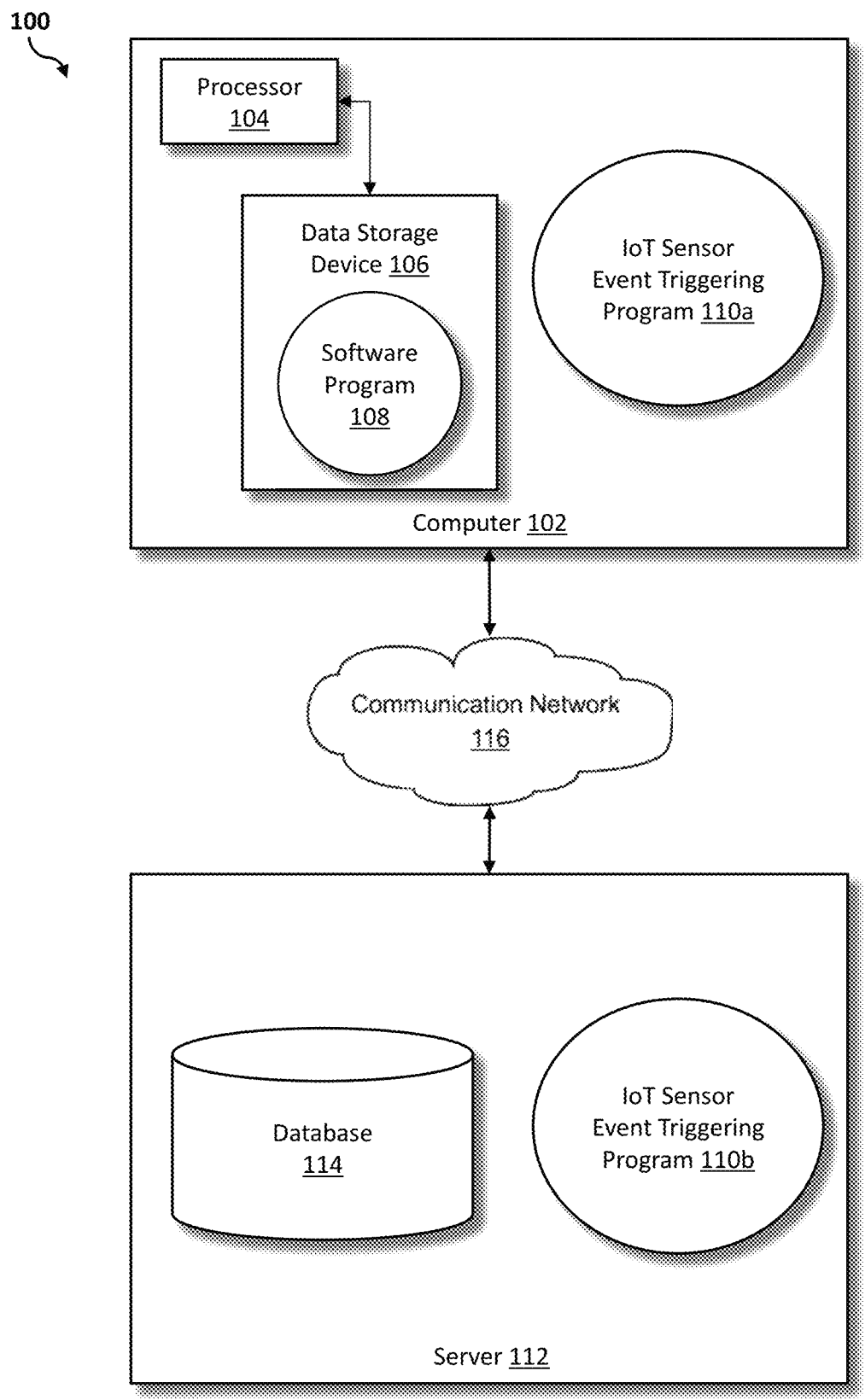
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for triggering IoT sensor events. As such, the present embodiment has the capacity to improve the technical field of home/office automation technology by using visual recognition and micro-location data to trigger or activate IoT sensor events. More specifically, the present embodiment may use image recognition (i.e., visual recognition) from a handheld camera device (i.e., mobile computing device (e.g., smart phone)) to determine if an internet enabled device (i.e., object) in a viewfinder of the IoT sensor event triggering program is an object capable of being controlled over a network, and if so, allow the user to trigger events of the IoT devices through the mobile computing device.

As previously described, when making "things" in our homes and offices internet enabled, a person may have to assign a unique name or know the name for a specific bank or group of lights for each internet enabled device. For example, a person assigns the name "living room lights" to switch on or off the lights located in the living room of the person's home. The person will use the name "living room lights" to instruct an application to switch on the lights located in the living room. As such, a person will assign a plethora of unique names for different devices within the person's home and office, which the person must keep track of and remember for the internet enabled devices to perform various functions at the command of the person.

As more and more of the "things" in our homes and offices become internet enabled, it will become increasingly difficult to give each one a unique name or to know what the name is of a light or group of lights nearby. For example, if you are in a thirty (30) floor building and want to turn on a bank of lights overhead, without knowing what the specific bank of lights is called you would have to go to the wall to flip the switch.

Therefore, it may be advantageous to, among other things, trigger or activate Internet of Things (IoT) devices through image recognition and proximity in addition to, or instead of, voice. As such, a user, by using a combination of image recognition and micro-location (i.e., the process of electronically determining the location of an object with a level of precision that locates the object within a building, room or visual area), may be able to perform a specific action or function (e.g., switch on or off (i.e., turn off or on) a single light switch in a huge bank of lights) on an internet enabled device, or a device that communicates through another technology (e.g., Bluetooth® (Bluetooth and all Bluetooth-based trademarks and logos are trademarks or registered trademarks of Bluetooth SIG, Inc. and/or its affiliates)).

According to at least one embodiment, the IoT sensor event triggering program may utilize image recognition from a handheld camera device to determine if the IoT device (i.e., object) in a viewfinder is an object capable of being controlled over a network. If the object may be controlled over a network, then the IoT sensor event triggering program may allow the user to trigger events of the IoT device through the mobile device.

According to at least one embodiment, the venue associated with the IoT sensor event triggering program may be equipped with a number of IoT devices. In addition, the layout associated with the venue may be determined to map the approximate location of the sensors set up within the venues.

According to at least one embodiment, the IoT sensor event triggering process may include a user with a mobile computing device with network capabilities and a camera (e.g., smart phone, tablet) that intends to engage another IoT device. The camera, which may be enabled by opening an application, may be utilized to determine the object in the image viewfinder using image recognition techniques. However, since there are likely many IoT sensors within the same visual area (e.g., a lot of different lighting sources in the ceiling), the image recognition may be combined with micro-location data from the current proximity of the user to the identified object.

According to at least one embodiment, the IoT sensor event triggering program may determine the location of the user by using various technologies (e.g., indoor micro-location approximation, proximity, Wi-Fi, cellular triangulation, magnetic finger pointing). Additional location details may be obtained using an onboard gyroscope to determine the yaw, pitch and roll of the computing device (e.g., smart phone). The orientation obtained using the yaw, pitch and roll of the computing device may be utilized to determine the individual IoT sensor within the field of view, when a plethora of identical devices are present at or near that general location.

According to at least one embodiment, if the IoT sensor event triggering program fails to recognize the object, then the IoT sensor event triggering program may allow manual entry of additional identifying information. The IoT sensor event triggering program may first alert the user that the object that the user intends to control is unknown (i.e., the IoT sensor event triggering program fails to recognize the object). The IoT sensor event triggering program may then prompt the user for manual entry of additional identifying information (e.g., location, description of the object, any unique name or identifier for the object or group of objects associated with that object) to determine if the object can be controlled over a network.

According to at least one embodiment, if the IoT sensor event triggering program recognizes the object, then the IoT sensor event triggering program may determine the approximate location of the object identified given the location of the user. The location of the object may then be compared against a known list of available IoT devices. If the IoT sensor event triggering program identifies a likely object, the IoT sensor event triggering program may determine if the user has the appropriate permissions to modify the sensor, which may be accomplished through various log in and user identification techniques. In the present embodiment, the IoT sensor event triggering program may determine the available actions that may be performed on the identified IoT device (e.g., a lightbulb may be switched on or off, dimmed, change color of the light), if the user has the appropriate authority. In the present embodiment, the user may then specify which action the user intends to perform via voice, a prompt response, a new virtual reality (VR) user experience (UX) on the computing device (e.g., a virtual light switch that the user can interact with, or gesture (e.g., shake hand to turn on or off light switch)).

According to at least one embodiment, if the IoT sensor event triggering program fails to identify the likely object, then the user may be alerted that the object is likely not network enabled.

According to at least one embodiment, the IoT sensor event triggering program may identify an object based on location and orientation of the object, provide data from the object based on the location of the object, record the location of the object and the object type using gyroscope and location sensors, and mark the location of the object using magnetic finger pointing and object recognition.

According to at least one embodiment, the IoT sensor event triggering program may be utilized in conjunction with Watson Personal Assistant™ (WPA) (e.g., Watson Personal Assistant™, Watson Personal Assistant and all Watson Personal Assistant-based trademarks and logos are trademarks or registered trademarks of International Business Machines Corporation and/or its affiliates), especially the voice assistant concept of the WPA with smart home and office spaces.

According to at least one embodiment, the IoT sensor event triggering program may be utilized in conjunction with Watson Image Recognition™ (e.g., Watson Image Recognition™, Watson Image Recognition and all Watson Image Recognition-based trademarks and logos are trademarks or registered trademarks of International Business Machines Corporation and/or its affiliates) to perform image recognition for the object in the IoT sensor event triggering program.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an IoT sensor event triggering program 110a. The networked computer environment 100 may also include a server 112 that is enabled to run an IoT sensor event triggering program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the IoT sensor event triggering program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the IoT sensor event triggering program 110a, 110b (respectively) to trigger an IoT sensor event by using visual recognition and micro-location data. The IoT sensor event triggering method is explained in more detail below with respect to FIG. 2.

Figure 2:
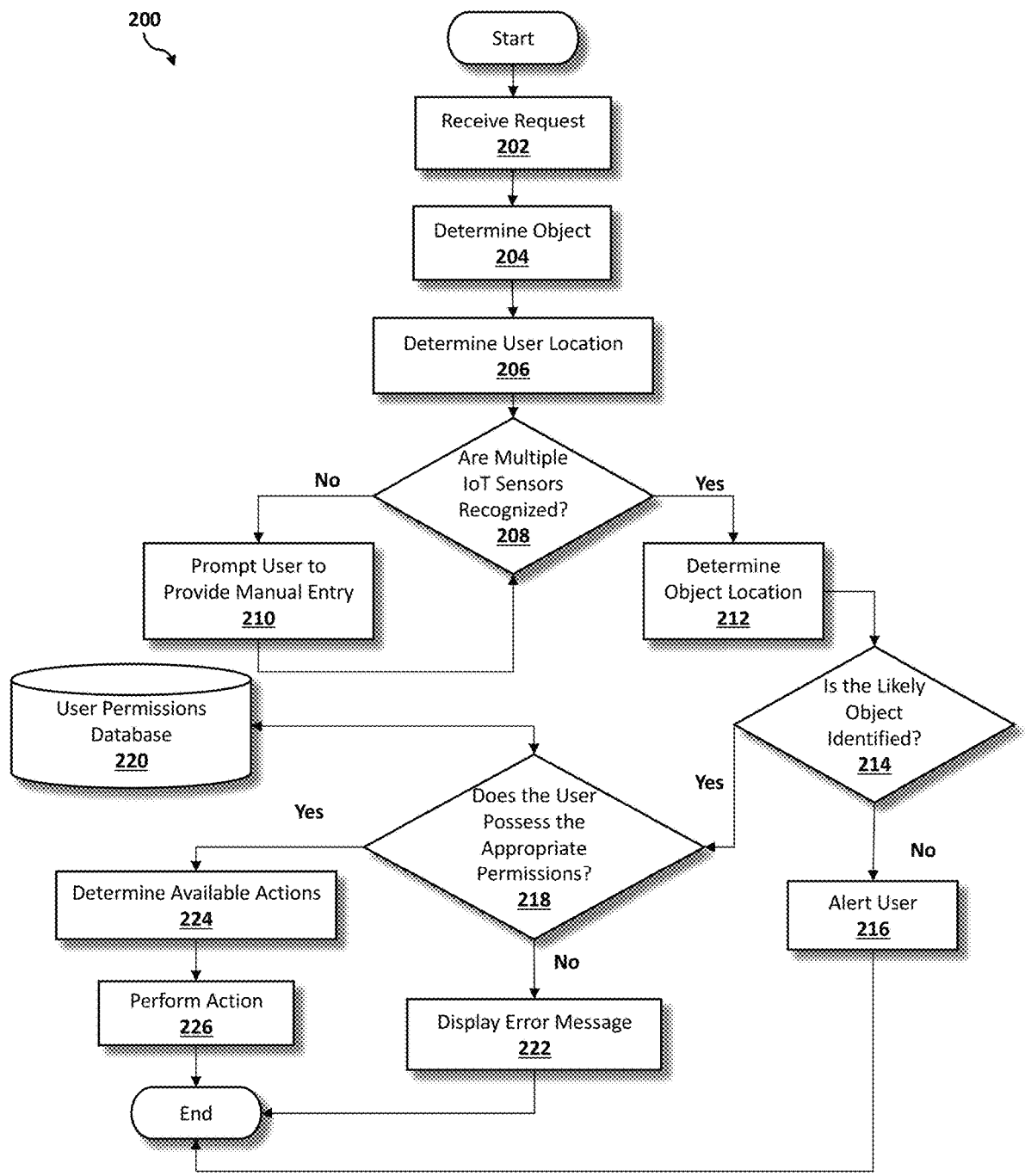
FIG. 2 is an operational flowchart illustrating a process for triggering Internet of Things (IoT) sensor events using visual recognition and micro-location data according to at least one embodiment.

Referring now to FIG. 2, an operational flowchart illustrating the exemplary IoT sensor event triggering process 200 used by the IoT sensor event triggering program 110a, 110b according to at least one embodiment is depicted.

At 202, a request is received by a user. Using a software program 108 (i.e., open the software program 108 or application program interface (API)) on the user device (e.g., user's computer 102), the IoT sensor event triggering program 110a, 110b may receive a request to trigger (i.e., activate) at least one Internet of Things (IoT) sensor event in a particular venue via communication network 116. The user may then point the user device (i.e., mobile computing device) in the direction of an object that the user intends to perform the triggered IoT sensor event on.

In the present embodiment, the venue (e.g., room, area) where the user is located may be equipped with a number of IoT enabled devices (i.e., objects), and the layout of the venue may be previously determined to map the approximate location of the sensor setup within the venue.

Additionally, in the present embodiment, the mobile computing device (e.g., user device) may include network capabilities (i.e., able to connect to the Internet or interconnect with other devices via Wi-Fi, cellular networks, near field communication or other forms of communications network 116) and a camera. By the user opening or utilizing the software program 108, the user may enable the camera associated with the user device.

For example, Employee A is working late and the building was recently equipped with network enabled overhead lighting. The lights are grouped in a series of banks of lights to improve energy consumption for the building. Before being enabled, all the lights were either turned on or off, or an employee would have to leave the employee's desk and attempt to turn on or off the light switches until the appropriate light switch was found. Since Employee A is the last employee left in the building and Employee A wants to switch off the lights prior to leaving the building, Employee A opens the IoT sensor event triggering program 110a, 110b application on Employee A's smart phone and points the smart phone above Employee A's head to the lights overhead.

Next, at 204, an object is determined. The IoT sensor event triggering program 110a, 110b may utilize the camera associated with the user device to determine at least one object in the image viewfinder on the user device. The IoT sensor event triggering program 110a, 110b may further utilize existing image recognition techniques (i.e., process of identifying and detecting an object or feature in a digital image or video). The existing image recognition techniques and methods (i.e., image classification techniques and methods) may include, for example, machine learning, deep learning methods (e.g., neural networks), histograms of oriented gradients (HOG), Scale-Invariant Feature Transform (SIFT), Speeded Up Robust Feature (SURF), Support Vector Machine (SVM) and Watson Image Recognition. The existing image recognition techniques may determine one or more possible objects that the user intends to perform an IoT sensor event on. Since the IoT sensor event triggering program 110a, 110b may determine multiple objects with IoT sensors in the image viewfinder, the IoT sensor event triggering program 110a, 110b may have to utilize micro-location data associated with the user location to refine the exact object that the user intends to perform the IoT sensor event (i.e., action) on.

In the present embodiment, the IoT sensor event triggering program 110a, 110b may generate a list of available IoT devices from the image captured in the image viewfinder by the camera associated with the user device. The list of available IoT devices may include the IoT devices present in the image.

In the present embodiment, the IoT sensor event triggering program 110a, 110b may determine only objects that are Internet enabled, or communicated through another technology (e.g., Bluetooth®), and are a part of an IoT sensor network. As such, if the IoT sensor event triggering program 110a, 110b is unable to determine at least one object since the image viewfinder is directed at objects that are not Internet enabled (i.e., none of the objects in the image viewfinder are Internet enabled, or communicated through another technology, and are not a part of an IoT sensor network), then the IoT sensor event triggering program 110a, 110b may display a message to the user indicating that no appropriate objects may be determined in the image viewfinder.

Continuing the previous example, the camera on Employee A's smart phone is activated and the image viewfinder captures an image in the direction that Employee A is pointing. The image includes several objects, namely, several groups of overhead lights, a motion activated video camera, and several air conditioning vents.

Then, at 206, a user location is determined. The IoT sensor event triggering program 110a, 110b may utilize existing technologies including, for example, indoor micro-location approximation, proximity of the user, Wi-Fi and cellular triangulation, and magnetic finger pointing to determine the user location.

In at least one embodiment, the IoT sensor event triggering program 110a, 110b may obtain additional details on the user location from an onboard gyroscope in conjunction with the yaw, pitch and roll of the user device (i.e., an orientation determination device) to determine the exact device the user want to interact with.

Continuing the previous example, the IoT sensor event triggering program 110a, 110b utilizes an indoor micro-location approximation to determine that Employee A is located approximately five feet from the door of the main exit of the office area.

Then, at 208, the IoT sensor event triggering program 110a, 110b determines whether multiple IoT sensors are recognized. The IoT sensor event triggering program 110a, 110b may determine whether multiple IoT sensors that are a part of an IoT sensor network are recognized. The IoT sensor event triggering program 110a, 110b may determine whether multiple (i.e., two or more) IoT sensors associated with the determined object(s) are detected within a certain proximity of the user location. If multiple IoT sensors are detected, then the IoT sensor event triggering program 110a, 110b may proceed to utilize the image recognition to match the IoT sensors with the determined object(s) by comparing the object location with a known list of available IoT devices. If no IoT sensor is detected, then the IoT sensor event triggering program 110a, 110b may prompt the user for a manual entry to determine the location of the object(s).

In the present embodiment, the IoT sensor event triggering program 110a, 110b may utilize a default setting to determine whether the multiple IoT sensors are within a certain proximity of the user in which the proximity is equal to or less than a set amount of feet from the user. For example, the IoT sensor event triggering program 110a, 110b may have a default setting that any IoT sensor is considered within proximity of the user if the IoT sensor is located within 20 feet of the current user location. However, the default setting for a certain proximity to the user location may be modified or changed by an administrator.

In the present embodiment, the IoT sensor event triggering program 110a, 110b may recognize only one IoT sensor. If only one IoT sensor is determined, then the IoT sensor event triggering program 110a, 110b may not have to combine the image generated with the current user location, since the IoT sensor is already recognized and the likely object already identified. As such, the IoT sensor event triggering program 110a, 110b may proceed with determining whether the user possess the appropriate permissions for the determined object. However, if there are multiple (i.e., two or more) recognized IoT sensors, then the IoT sensor event triggering program 110a, 110b may proceed with combining the image generated at 204 with the current user location as detailed in the subsequent steps in FIG. 2.

If the IoT sensor event triggering program 110a, 110b determines that multiple IoT sensors are not recognized at 208, then the IoT sensor event triggering program 110a, 110b prompts the user to provide a manual entry at 210. The IoT sensor event triggering program 110a, 110b may notify (i.e., alert) the user that the object the user intends to control is unknown. The IoT sensor event triggering program 110a, 110b may then prompt the user for a manual entry of additional identifying information to determine if the object can be controlled over a network (i.e., associated with an IoT sensor).

In at least one embodiment, the IoT sensor event triggering program 110a, 110b may (e.g., via manual entry dialog box) display a message indicating that the object is unknown. At the bottom of the manual entry dialog box, for example, there may be a prompt to the user indicating that the user may provide a manual entry of additional identifying information to determine the object. If the user decides to provide additional identifying information, then the user may select the "Yes, Manual Entry" button (i.e., green button, checkmark button). If, however, the user decides not to provide additional identifying information, then the user may select the "No, Thanks" button (i.e., red button, X button). The dialog box may then disappear and the user may exit the IoT sensor event triggering program 110a, 110b.

In at least one embodiment, if the user decides to provide a manual entry, then the previous manual entry dialog box may expand for the user to provide additional identifying information (e.g., generic name of the object, possible unique name to identify the object(s)). The expanded manual entry dialog box may include a list of categories for the additional identifying information, for example, generic name of the object(s), possible unique name to identify the object(s) or associated IoT sensor network, and description of the object(s). To the left of each category, the IoT sensor event triggering program 110a, 110b may include a small box. When the user selects a category by clicking on the box next to that category, a comment box to the right of the category may be displayed. The user may include the additional identifying information associated with the object (s) that box. The IoT sensor event triggering program 110a, 110b may permit the user to select one or more categories for the additional identifying information. Once the user selected the appropriate boxes and completed the appropriate comment boxes with the additional identifying information, then the user may select the "Submit" button at the bottom of the manual entry dialog box. The IoT sensor event triggering program 110a, 110b may then determine whether the manual entry provided sufficient additional identifying information to recognize the object(s).

If the IoT sensor event triggering program 110a, 110b is still unable to recognize multiple IoT sensors at 208, then the IoT sensor event triggering program 110a, 110b may determine that additional identifying information may be necessary and the user may be prompted to provide more additional identifying information via another manual entry and repeat step 210.

Continuing the previous example, if the IoT sensor event triggering program 110a, 110b was unable to recognize any IoT sensors in the image captured by the image viewfinder on the Employee A's smart phone, then the IoT sensor event triggering program 110a, 110b may display a dialog box that indicates that additional identifying information is necessary to recognize the IoT sensor associated with the object. At the bottom of the dialog box, Employee A will select whether Employee A decides to proceed with providing the additional identifying information, or not. If Employee A decides to provide a manual entry, then Employee A will provide a unique name for the object and the generic name for the lights. The Employee A will enter as a generic name for the object "Overhead Exit Lights" and the possible unique name for the object "Exit Lights".

In another embodiment, the IoT sensor event triggering program 110a, 110b may prompt the user (e.g., via another dialog box) with proposed manual entries on additional identifying information for the user to provide for the IoT sensor event triggering program 110a, 110b to recognize the IoT sensor. At the end of the dialog box, for example, the user may click an "Accept" button or a "Reject" button for each of the proposed manual entries. If the user accepts the proposed manual entry, then the IoT sensor event triggering program 110a, 110b may automatically include the proposed manual entry into the manual entry dialog box and proceed to 208 to determine whether multiple IoT sensors are recognized. If, however, the user rejects the proposed manual entry, then the IoT sensor event triggering program 110a, 110b may proceed to prompt the user to provide a manual entry and the dialog box with the proposed manual entry may disappear.

In another embodiment, the IoT sensor event triggering program 110a, 110b may recommend possible objects associated with IoT sensors. The IoT sensor event triggering program 110a, 110b may provide a prompt to the user (e.g., via another dialog box) recommending possible objects. At the end of the dialog box, for example, the user may click an "Accept" button or a "Reject" button for each of the recommended objects. If the user accepts the recommended object, then the IoT sensor event triggering program 110a, 110b may automatically close the dialog box and proceed to 212 to determine the object location. If, however, the user rejects the recommended object, then the IoT sensor event triggering program 110a, 110b may proceed to prompt the user to provide a manual entry and the dialog box with the recommended object may disappear.

In another embodiment, if the IoT sensor event triggering program 110a, 110b recognizes only one IoT sensor after receiving at least one manual entry from the user, then the IoT sensor event triggering program 110a, 110b may proceed to determine whether the user possesses the appropriate permissions since the IoT sensor associated with the determined object has been recognized and the likely object identified.

If, however, the IoT sensor event triggering program 110a, 110b determines that multiple IoT sensors are recognized at 208, then the IoT sensor event triggering program 110a, 110b determines the object location at 212. The IoT sensor event triggering program 110a, 110b may then determine the approximate location of the objects identified based on the determined user location at 206 and the recognized IoT sensors at 208. The location of the objects may then be compared to the previously generated list of available IoT devices at 204.

Continuing the previous example, since the IoT sensor event triggering program 110a, 110b recognized multiple IoT sensors associated with each group of overhead lights, motion activated video camera, and several air conditioning vents from the image captured by the image viewfinder on Employee A's smart phone, the IoT sensor event triggering program 110a, 110b proceeds with determining the location of each recognized object. The IoT sensor event triggering program 110a, 110b determines that each of the recognized objects are located approximately ten to twenty feet from the main exit of the office space, and two of the overhead lights are connected to other lights located in another adjacent office space, where nine employees of that adjacent office space are still present.

Then, at 214, the IoT sensor event triggering program 110a, 110b determines whether the likely object(s) is identified. The IoT sensor event triggering program 110a, 110b may generate (i.e., calculate) a confidence score to determine whether the likely object(s) has been identified by combining the micro-location data generated on the location of the user with the image recognition of the object(s). The confidence score (i.e., from 0-100, or another range of normalized numbers) may satisfy a threshold to be considered a likely object. The IoT sensor event triggering program 110a, 110b may have a default setting, where any normalized number greater than 50% (or any normalized range of numbers that is greater than 50% out of 100%), will satisfy the threshold value. Therefore, the IoT sensor event triggering program 110a, 110b may consider an object that satisfies the threshold to be a likely object. If, however, the confidence score is less than or equal to 50% (or any normalized range of numbers that is less than or equal to 50% out of 100%), the IoT sensor event triggering program 110a, 110b may consider an object to fail to satisfy the threshold and not be a likely object(s). In at least one embodiment, the default threshold value may be modified by an administrator by changing the numeric value for the threshold value in the "Settings" options located at the bottom right side of the main screen for the IoT sensor event triggering program 110a, 110b.

In at least one embodiment, the IoT sensor event triggering program 110a, 110b may further determine whether the likely object(s) is network enabled (i.e., controlled over an IoT sensor network) and utilize mapping or tracking techniques to map the likely object(s) to the building floor plan. If an object is not network enabled, then the object may not be considered a likely object by the IoT sensor event triggering program 110a, 110b.

If the IoT sensor event triggering program 110a, 110b determines that the likely object(s) is not identified at 214, then the IoT sensor event triggering program 110a, 110b alerts the user at 216. If the IoT sensor event triggering program 110a, 110b is unable to identify the likely object(s) based on the micro-location data associated with the user location and the image recognition of the object(s), then the IoT sensor event triggering program 110a, 110b may alert the user (e.g., via dialog box) that the IoT sensor event triggering program 110a, 110b is unable to identify a likely object(s). For example, the IoT sensor event triggering program 110a, 110b may alert the user that the likely object(s) is not identified since the object is most likely not network enabled.

Continuing the previous example, if, based on the location of Employee A, five feet from the main exit door of the office space, and the image recognition for the object, the IoT sensor event triggering program 110a, 110b is unable to identify a likely object, then Employee A will receive an alert stating that the IoT sensor event triggering program 110a, 110b is unable to identify a likely object and that the object is most likely not network enabled.

If, however, the IoT sensor event triggering program 110a, 110b determines that the likely object(s) is identified at 214, then the IoT sensor event triggering program 110a, 110b determines whether the user possesses the appropriate permissions at 218. Since at least one likely object(s) has been identified, the IoT sensor event triggering program 110a, 110b may then prompt (e.g., via dialog box) the user with a list of likely objects based on the image recognition of the object and the micro-location data on the user location. The dialog box, for example, may include a picture of the likely object(s), may zoom into the image to identify the object(s), or may highlight the object(s) in the image. Depending on the user device, the user may be able to touch the screen to select the appropriate object from the list of likely object(s) generated by the IoT sensor event triggering program 110a, 110b. When the user selects the object(s), then the dialog box disappears.

Continuing the previous example, the IoT sensor event triggering program 110a, 110b calculates a confidence score for each of the identified objects. There is a confidence score of 98% for each of the three overhead lights for solely Employee A's office space, a confidence score of 85% for the air conditioning vents, and a confidence score of 80% for the motion activated video camera located approximately ten to twenty feet from the main exit of the office space. As such, each of these objects satisfy the threshold value to be considered likely objects. The IoT sensor event triggering program 110a, 110b then prompts Employee A with a list of the likely objects, and Employee A selects the three overhead lights, air conditioning vents and motion activated camera as objects that Employee A intends to control or modify. The IoT sensor event triggering program 110a, 110b may then determine whether Employee A possesses the appropriate permissions for each of the likely objects.

Then, at 218, the IoT sensor event triggering program 110a, 110b determines whether the user possesses the appropriate permissions (i.e., authority) to control or modify the object(s). The IoT sensor event triggering program 110a, 110b may first have to confirm the identity of the user to determine whether the user possesses the appropriate permissions. Depending on the user device, the IoT sensor event triggering program 110a, 110b may be able to confirm the identity of the user. If the user is utilizing a personal mobile computing device (i.e., used by one person), then, by entering a passcode prior to opening the IoT sensor event triggering program 110a, 110b, the user has already logged in and the IoT sensor event triggering program 110a, 110b may have already identify the user. In at least one embodiment, even if the personal mobile computing device is utilized by one person, the IoT sensor event triggering program 110a, 110b may prompt the user (e.g., via GUI) to confirm the user identity. The GUI, for example, may state the user name and indicate the user to confirm that the identified user is using the personal mobile computing device. If, however, the user identity does not match the user name, then the user may indicate (e.g., by selecting the "That is Not Me" button located at the bottom of the GUI) that this is a different user. The user may then be prompted to enter the user's username and password.

If, however, the user is utilizing a mobile computing device that is shared between multiple users, then the IoT sensor event triggering program 110a, 110b may prompt (e.g., via graphical user interface (GUI)) the user to enter the username and password to identify the user's identity. In at least one embodiment, for a mobile computing device with multiple users, the IoT sensor event triggering program 110a, 110b may prompt the user (e.g., via GUI) with a list of the possible usernames, and the user may select the appropriate username. The IoT sensor event triggering program 110a, 110b may then prompt the user to enter the appropriate password for that username to confirm the user identity. In at least one embodiment, the IoT sensor event triggering program 110a, 110b may utilize other user identification techniques (e.g., facial recognition, fingerprints, biometric recognition, series of security questions) to determine the user identity depending on the features associated with the user device. Once the user identity is confirmed, then the user may be presented with a "Confirmed Identity" on the screen of the user device.

Continuing the previous example, since Employee A is using Employee A's personal smart phone, the IoT sensor event triggering program 110a, 110b previously confirmed Employee A's identity when Employee A utilized facial recognition to unlock the smart phone.

Once the IoT sensor event triggering program 110a, 110b determines the user identity, the IoT sensor event triggering program 110a, 110b may access a user permissions database 220 (e.g., database 114), which includes a list of the users and the authority granted (i.e., permissions) associated with each user, to determine whether the user possesses the appropriate permissions to control or modify the identified object(s). The IoT sensor event triggering program 110a, 110b may access the user permissions database 220 and compare the identified object(s) with the user identity to determine whether the user has authority to control or modify the identified object(s) and what, if any, available actions the user has authority to perform on the identified object(s).

If the IoT sensor event triggering program 110a, 110b determines that the user fails to possess the appropriate permissions at 218, then the IoT sensor event triggering program 110a, 110b displays an error message to the user at 222. If, based on the data in the user permissions database 220, the IoT sensor event triggering program 110a, 110b determines that the user does not possess the appropriate permissions to modify or control the identified object(s), then the user may be prompted with an error message stating that the user's request has been denied due to a failure to possess the appropriate permissions.

In at least one embodiment, if the IoT sensor event triggering program 110a, 110b identified two or more likely objects and the user selects two or more likely objects, then user is not alerted with an error message, as long as the user possesses the appropriate permissions for at least one the identified objects. Instead, the IoT sensor event triggering program 110a, 110b may prompt the user to control or modify the identified object that the user possesses the appropriate permissions for. In at least one embodiment, the IoT sensor event triggering program 110a, 110b may alert the user whether or not the user possesses the appropriate permissions for each of the identified objects. If there are two or more identified objects, the IoT sensor event triggering program 110a, 110b may list whether the user possesses the appropriate permissions for each of the identified objects.

Continuing the previous example, the IoT sensor event triggering program 110a, 110b then accesses the user permissions database 220 to determine whether Employee A has permission to modify the identified likely objects; the three overhead lights for solely Employee A's office space, the air conditioning vents and the motion activated video camera. The user permissions database 220 does not list Employee A as an approved person (i.e., possessing the appropriate permissions or having authority) to control or modify the motion activated video camera, which is limited to security personnel only, and the air conditioning vents, which automatically turn off and on based on time and temperature. However, since Employee A has possesses permission for at least one of the identified likely objects, Employee A is not presented with an error message.

If, however, the IoT sensor event triggering program 110a, 110b determines that the user possesses the appropriate permissions at 218, then the IoT sensor event triggering program 110a, 110b determines the available actions at 224. If, based on the data in the user permissions database 220, the IoT sensor event triggering program 110a, 110b determines that the user possesses the appropriate permissions to modify or control the identified object(s), then the IoT sensor event triggering program 110a, 110b may prompt the user (e.g., via dialog box) with a list of available actions that the user has authority to perform on the identified object. The list of available actions may include a list of available actions for each identified object based on the current state or mode of the identified object. For example, if the light is currently switched on, then the available action may include switching the lights off. Depending on the user device, the user may be able to touch the screen to select one of the available actions for each identified object. When the user selects the object, then the dialog box disappears.

In the present embodiment, the IoT sensor event triggering program 110a, 110b may provide a list of available actions by alternate means (i.e., not written means) such as, auditory means (e.g., a voice may verbally state the available actions), or a VR user experience (UX) on the user device (e.g., an animated image of a light switch may appear on the right side of the image in which the user can use the user's fingers to pull the switch down or up). In at least one other embodiment, the IoT sensor event triggering program 110a, 110b may select an action to be performed on the identified object (i.e., trigger the IoT sensor event) by alternate means (i.e., not selecting from the written options on the user device), such as, voice activation (e.g., user states "Turn Off Lights"), a prompt response (e.g., clapping hands, snapping fingers), a gesture (e.g., shaking user device), or VR UX on the user device (e.g., pulling down the animated light switch image on the user device).

Continuing the previous example, of the identified likely objects, Employee A possesses permission to modify only the three overhead lights that control the overhead lights in Employee A's office space. As such, the IoT sensor event triggering program 110a, 110b displays an animated light switch on the upper right side of the screen of the smart phone. Employee A uses a finger to pull down the switch on the animated light switch.

Then, at 226, the action is performed. After the user selects at least one of the determined available actions, the IoT sensor event triggering program 110a, 110b may perform the action (i.e., trigger the IoT sensor event).

Continuing the previous example, once Employee A pulls down the switch on the animated light switch on Employee A's smart phone, the three banks of overhead lights located near the main exit of the office space are turned off without Employee A moving from the exit door. Employee A then proceeds to leave the office space and building.

The functionality of a computer may be improved by the IoT sensor event triggering program 110a, 110b because the IoT sensor event triggering program 110a, 110b may be utilized to combine image recognition (i.e., visual recognition), micro-location data (i.e., generated based on the location of the object to the proximity of the user or geolocation data) and/or the orientation of the phone (e.g., yaw, pitch and roll of the user device) to trigger IoT sensor events on one or more objects, thereby permitting the activation of the objects by other alternative means (e.g., a prompt response by the user, a gesture, VR enabled device, or button press on a mobile application), instead of a voice prompt. The IoT sensor event triggering program 110a, 110b presents more improvements on the existing capabilities and functionalities of the computer and the organization and accessibility of IoT devices, without limiting activation to only voice activation, especially when multiple IoT devices are located near the current user location.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
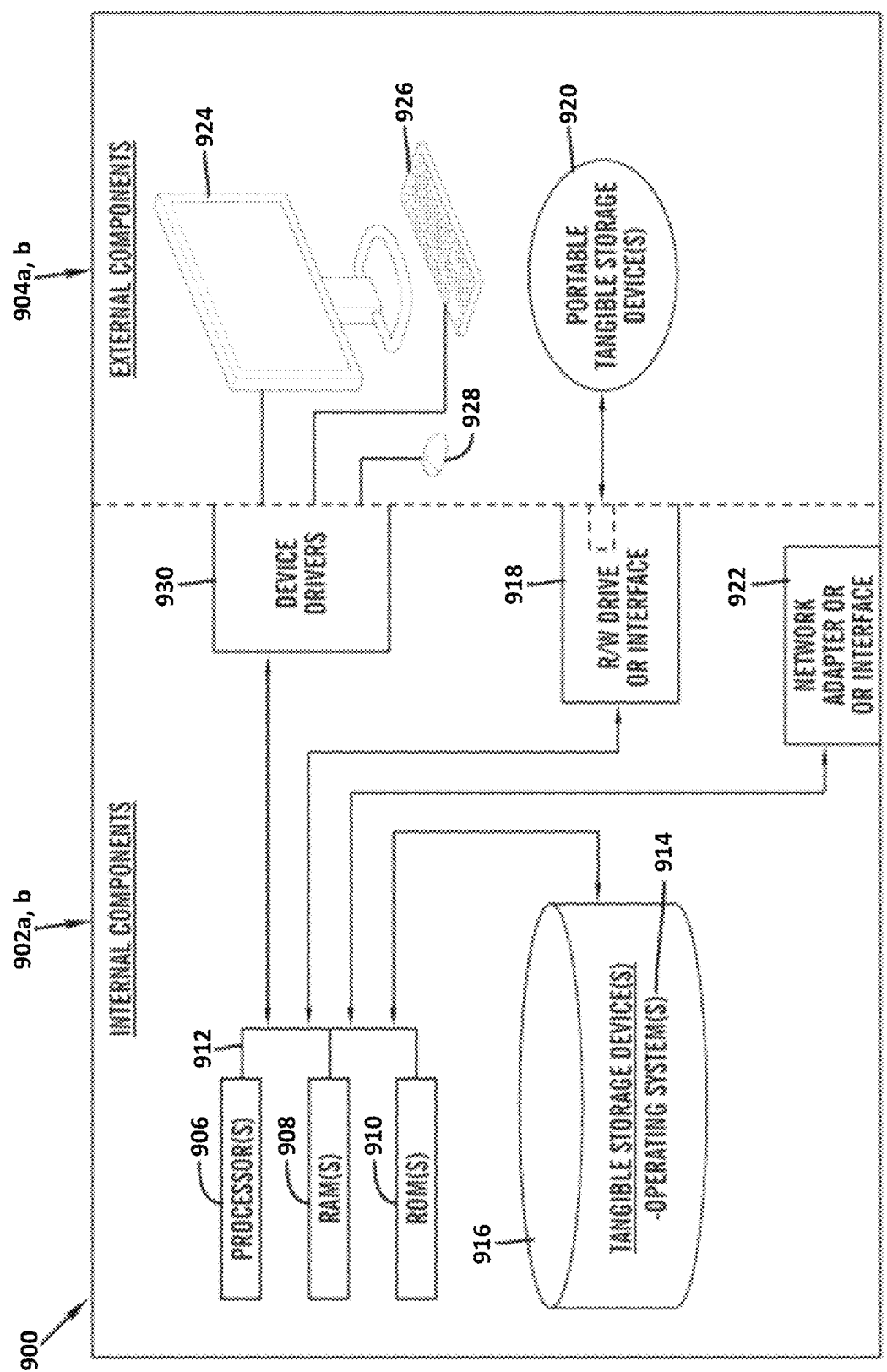
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the IoT sensor event triggering program 110a in client computer 102, and the IoT sensor event triggering program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the IoT sensor event triggering program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the IoT sensor event triggering program 110a in client computer 102 and the IoT sensor event triggering program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the IoT sensor event triggering program 110a in client computer 102 and the IoT sensor event triggering program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
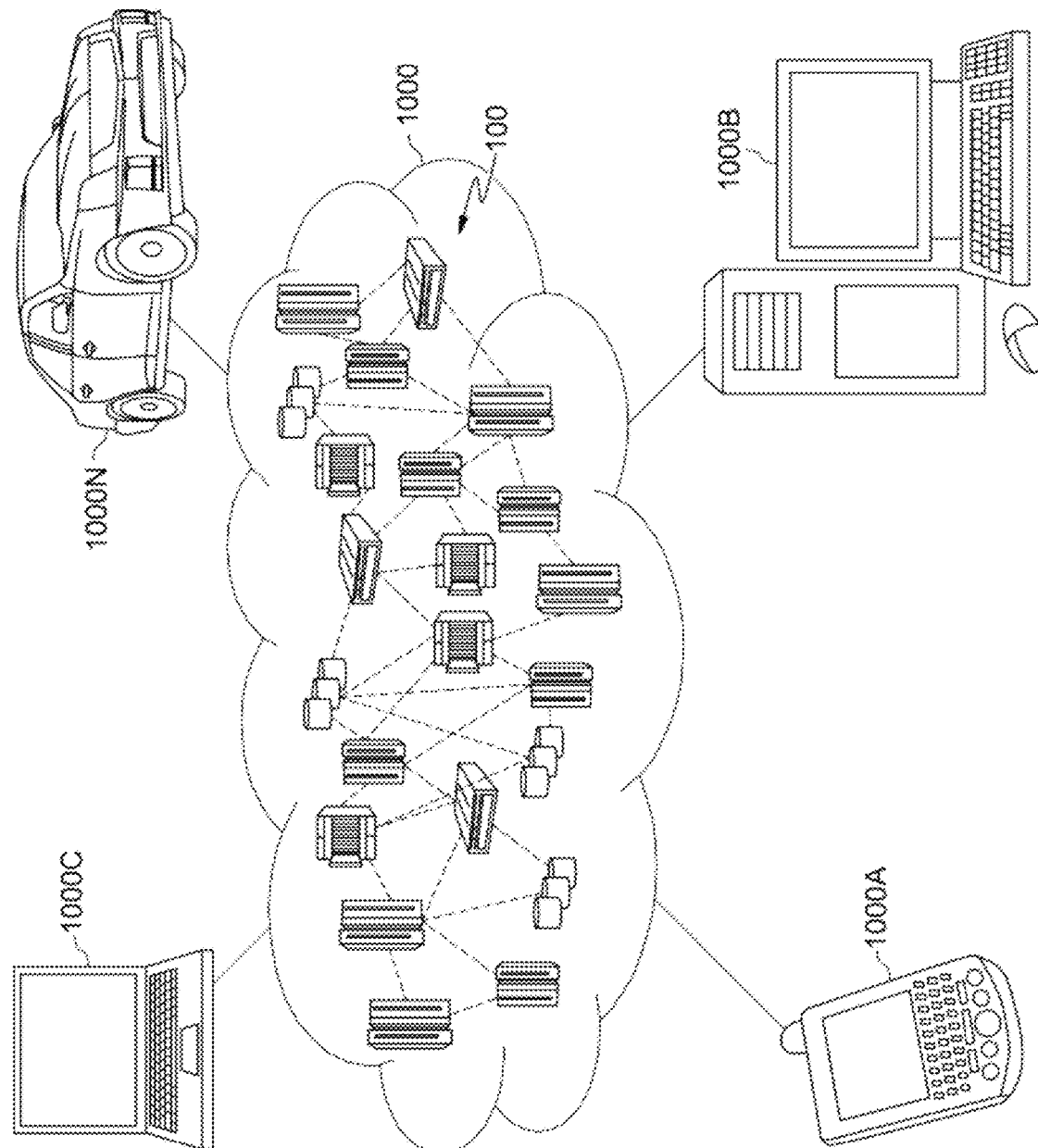
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
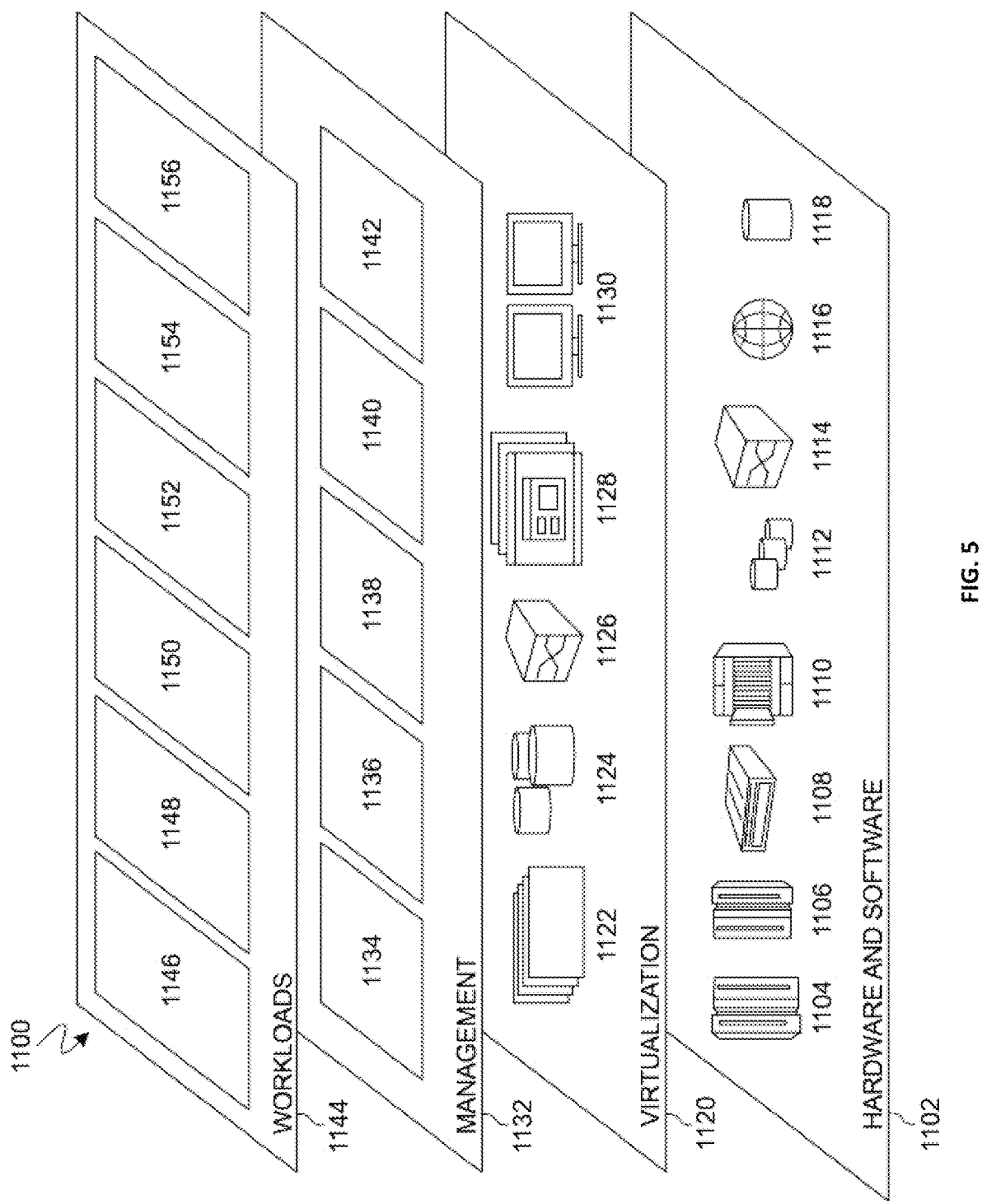
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and IoT sensor event triggering 1156. An IoT sensor event triggering program 110*a*, 110*b* provides a way to trigger or activate IoT sensor events utilizing visual recognition and micro-location data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for using a set of visual recognition data and a set of micro-location data to trigger one or more Internet of Things (IoT) sensor events, comprising:
    triggering the one or more IoT sensor events to at least one object based on receiving a user request, wherein the at least one object is selected for triggering using at least one camera device, and further based on at least one micro-location device within a certain proximity to a location of the user;
    recording a location of the object and an object type;
    receiving a request, by the user, to trigger the one or more IoT sensor events associated with the at least one object;
    determining the at least one object with the at least one camera by utilizing one or more image recognition devices;
    determining the user location by utilizing the at least one micro-location device;
    comparing the determined at least one object to the set of IoT sensors determined within the certain proximity to the user location; and
    matching at least one IoT sensor from the compared set of IoT sensors within the certain proximity to the user location with the determined at least one object.

2. The method of claim 1, in which the at least one micro-location device includes an indoor micro-location approximation, a proximity determination device, a camera, a global positioning system, Wi-Fi, a cellular triangulation device, an onboard gyroscope, an orientation determination device associated with the user device, and a magnetic finger pointing device.

3. The method of claim 1, further comprising:
    calculating a confidence score for the at least one object;
    determining that the calculated confidence score for the at least one object satisfies a threshold value; and
    identifying the at least one object based on the determined confidence score.

4. The method of claim 3, further comprising:
    in response to identifying the at least one object, confirming an identity of the user;
    determining the user possesses one or more appropriate permissions to trigger one or more IoT sensors associated with at least one available IoT device based on the confirmed identity of the user;
    determining a plurality of available actions associated with the one or more IoT sensors associated with the at least one available IoT device to be performed by the user;
    receiving at least one of the determined plurality of available actions to be performed by the user; and
    performing the received at least one of the determined plurality of available actions.

5. The method of claim 4, wherein receiving at least one of the determined plurality of available actions to be performed by the user, further comprises:
    implementing at least one of the determined plurality of available actions to be performed by at least one of the following activation modes:
    i. a voice prompt,
    ii. a prompt response by the user,
    iii. a virtual reality user experience on a user device,
    iv. a gesture by the user, and
    v. a button press within a mobile application.

6. The method of claim 1, in which the user is located at a venue with a plurality of available IoT devices.

7. The method of claim 6 in which a layout of the venue is determined to map an approximate location of one or more IoT sensors associated with at least one available IoT device of the plurality of available IoT devices.

8. The method of claim 1, further comprising:
    in response to determining that the at least one object is unknown, alerting the user; and
    prompting the user to manually enter a plurality of additional identifying information associated with the at least one object.

9. A computer system for using a set of visual recognition data and a set of micro-location data to trigger one or more Internet of Things (IoT) sensor events comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

triggering the one or more IoT sensor events to at least one object based on receiving a user request, wherein the at least one object is selected for triggering using at least one camera device, and further based on at least one micro-location device within a certain proximity to a location of the user;

recording a location of the object and an object type;

receiving a request, by the user, to trigger the one or more IoT sensor events associated with the at least one object;

determining the at least one object with the at least one camera by utilizing one or more image recognition devices;

determining the user location by utilizing the at least one micro-location device;

comparing the determined at least one object to the set of IoT sensors determined within the certain proximity to the user location; and matching at least one IoT sensor from the compared set of IoT sensors within the certain proximity to the user location with the determined at least one object.

10. The computer system of claim 9, in which the at least one micro-location device includes an indoor micro-location approximation, a proximity determination device, a camera, a global positioning system, Wi-Fi, a cellular triangulation device, an onboard gyroscope, an orientation determination device associated with the user device, and a magnetic finger pointing device.

11. The computer system of claim 9, further comprising:
calculating a confidence score for the at least one object;
determining that the calculated confidence score for the at least one object satisfies a threshold value; and
identifying the at least one object based on the determined confidence score.

12. The computer system of claim 11, further comprising:
in response to identifying the at least one object, confirming an identity of the user;
determining the user possesses one or more appropriate permissions to trigger one or more IoT sensors associated with at least one available IoT device based on the confirmed identity of the user;
determining a plurality of available actions associated with the one or more IoT sensors associated with the at least one available IoT device to be performed by the user;
receiving at least one of the determined plurality of available actions to be performed by the user; and
performing the received at least one of the determined plurality of available actions.

13. The computer system of claim 12, wherein receiving at least one of the determined plurality of available actions to be performed by the user, further comprises:

implementing at least one of the determined plurality of available actions to be performed by at least one of the following activation modes:
i. a voice prompt,
ii. a prompt response by the user,
iii. a virtual reality user experience on a user device,
iv. a gesture by the user, and
v. a button press within a mobile application.

14. The computer system of claim 9, in which the user is located at a venue with a plurality of available IoT devices.

15. The computer system of claim 14 in which a layout of the venue is determined to map an approximate location of one or more IoT sensors associated with at least one available IoT device of the plurality of available IoT devices.

16. The computer system of claim 9, further comprising:
in response to determining that the at least one object is unknown, alerting the user; and
prompting the user to manually enter a plurality of additional identifying information associated with the at least one object.

17. A computer program product for using a set of visual recognition data and a set of micro-location data to trigger one or more Internet of Things (IoT) sensor events, comprising:

one or more non-transitory computer-readable storage media and program instructions stored on at least one of the one or more tangible storage media, the program instructions executable by a processor to cause the processor to perform a method comprising:

triggering the one or more IoT sensor events to at least one object based on receiving a user request, wherein the at least one object is selected for triggering using at least one camera device, and further based on at least one micro-location device within a certain proximity to a location of the user;

recording a location of the object and an object type;

receiving a request, by the user, to trigger the one or more IoT sensor events associated with the at least one object;

determining the at least one object with the at least one camera by utilizing one or more image recognition devices;

determining the user location by utilizing the at least one micro-location device;

comparing the determined at least one object to the set of IoT sensors determined within the certain proximity to the user location; and matching at least one IoT sensor from the compared set of IoT sensors within the certain proximity to the user location with the determined at least one object.

* * * * *